US012430997B2

(12) United States Patent
Washizu et al.

(10) Patent No.: US 12,430,997 B2
(45) Date of Patent: Sep. 30, 2025

(54) DISASTER PREVENTION APPARATUS

(71) Applicant: HOCHIKI Corporation, Tokyo (JP)

(72) Inventors: Keisuke Washizu, Tokyo (JP); Manabu Dohi, Tokyo (JP)

(73) Assignee: HOCHIKI Corporation, Tokyo (JP)

( * ) Notice: Subject to any disclaimer, the term of this patent is extended or adjusted under 35 U.S.C. 154(b) by 11 days.

(21) Appl. No.: 18/118,811

(22) Filed: Mar. 8, 2023

(65) Prior Publication Data

US 2023/0290237 A1 Sep. 14, 2023

Related U.S. Application Data

(63) Continuation-in-part of application No. PCT/JP2020/040837, filed on Oct. 30, 2020.

(51) Int. Cl.
*G08B 17/103* (2006.01)

(52) U.S. Cl.
CPC .................................. *G08B 17/103* (2013.01)

(58) Field of Classification Search
CPC ...... G08B 17/103; G08B 17/113; G08B 5/36; G08B 29/145; G08B 17/06; G08B 17/10
See application file for complete search history.

(56) References Cited

U.S. PATENT DOCUMENTS 6,300,876 B1 * 10/2001 Sakurai .................. G08B 17/00 340/630
2003/0058117 A1 3/2003 Kari et al.
2009/0243835 A1 * 10/2009 Katou .................. G08B 29/183 340/521
2010/0259376 A1 10/2010 Hong

FOREIGN PATENT DOCUMENTS

EP 1049061 A2 11/2000
EP 3866130 A1 8/2021
JP H02-257399 A 10/1990
JP H09-128666 A 5/1997
JP 2003036488 A 2/2003
JP 2003248878 A * 9/2003

(Continued)

OTHER PUBLICATIONS

International Search Report & Written Opinion of PCT/JP2020/040837 dated Dec. 1, 2020, all pages cited in its entirety.

(Continued)

*Primary Examiner* — Rufus C Point
(74) *Attorney, Agent, or Firm* — Burr & Forman

(57) ABSTRACT

A detector 100 includes: an outer cover 11; and an indicator that outputs at least information about a test of a disaster prevention apparatus by emitting light, and that is provided in the outer cover 11, wherein when at least a part of the outer cover 11 is covered with a test apparatus in order to perform the test of the detector 100, at least a part of an indication surface of the indicator is exposed to an outside of the test apparatus and the indicator is formed in a side portion of the outer cover 11, the indicator is formed in an edge portion of a front portion of the outer cover 11, and the indicator is a part of a light guide portion 111 that is formed in the outer cover 11, and that guides light from a light emitter.

3 Claims, 9 Drawing Sheets

(56) References Cited

FOREIGN PATENT DOCUMENTS

| | | | | |
|---|---|---|---|---|
| JP | 2006215865 | A | | 8/2006 |
| JP | 2007011684 | A | * | 1/2007 |
| JP | 1332979 | | | 6/2008 |
| JP | 2012198757 | A | | 10/2012 |
| JP | 2017107534 | A | | 6/2017 |
| JP | 2019168914 | A | * | 10/2019 |
| JP | 2019200810 | A | * | 11/2019 |
| KR | 100313337 | B1 | * | 11/2001 |
| WO | 2019189128 | A1 | | 10/2019 |

OTHER PUBLICATIONS

Search Report issued in corresponding European Patent Application No. 20959864 mailed Jul. 1, 2024, all pages cited in its entirety.
Written Opinion issued in corresponding European Patent Application No. 20959864.8 mailed Jul. 1, 2024, all pages cited in its entirety.
Communication pursuant to Article 94(3) EPC from corresponding EP Application No. 20959864.8, mailed Apr. 23, 2025, all pages cited in its entirety.

* cited by examiner

DISASTER PREVENTION APPARATUS

CROSS REFERENCE TO RELATED APPLICATIONS

The present application claims the benefit of the PCT application No. PCT/JP2020/040837 filed on Oct. 30, 2020, the disclosure of which is incorporated by reference its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a disaster prevention apparatus.

BACKGROUND ART

In the related art, a detector that is installed on a ceiling, etc. to detect heat caused by fire has been known (for example, refer to Patent Literature 1). In the detector, a test is periodically performed on the detector, but the detector is configured to output information about the test by causing an indicator light to emit light, the indicator light being provided on an outer cover of the detector.

CITATION LIST

Patent Literature

Patent Literature 1: Laid-Open Patent Publication in Japan No. 2012-198757

SUMMARY OF INVENTION

Technical Problem

However, since a test of the detector of Patent Literature 1 is performed by applying heat to the detector, for example, using a test jig having a cylindrical shape and covering at least a part of the detector, there is a possibility that the indicator light of the detector is hidden by the test jig and is not visible while heat is applied in a state where the at least a part of the detector is covered with the test jig, and a user cannot identify information about the test while heat is applied.

Therefore, there is room for improvement in terms of being able to identify the information about the test even in a state where the at least a part of the detector is covered with the test jig.

It is an object of the present invention to solve the problems of the above mentioned prior arts.

Solution to Problem

One aspect of the present invention provides a disaster prevention apparatus comprises: an outer cover; and an indicator that outputs at least information about a test of the disaster prevention apparatus by emitting light, and that is provided in the outer cover, wherein when at least a part of the outer cover is covered with a test apparatus in order to perform the test of the disaster prevention apparatus, at least a part of an indication surface of the indicator is exposed to an outside of the test apparatus.

DESCRIPTION OF EMBODIMENTS

Figure 1:
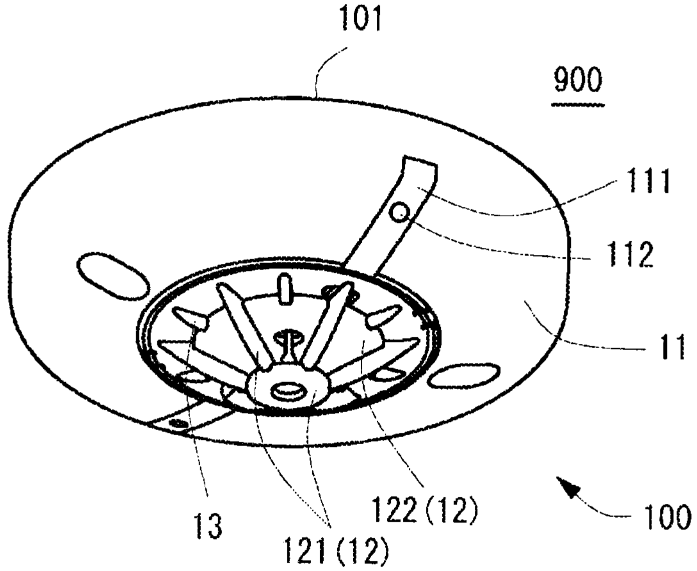
FIG. 1 is a perspective view of a detector according to a first embodiment.

Hereinafter, embodiments of a disaster prevention apparatus according to the invention will be described in detail with reference to the drawings. Incidentally, the invention is not limited by the embodiments.

Basic Concept of Embodiments

First, the basic concept of the embodiments will be described. The embodiments generally relate to the disaster prevention apparatus.

The "disaster prevention apparatus" is an apparatus used for prevention of a disaster, for example, is a concept including an apparatus that detects an abnormality of a monitoring region, etc., and as one example, is a concept including a heat detector, a fire detector, a gas detector, a smoke detector, etc. In addition, the "disaster prevention apparatus" includes, for example, an outer cover and an indicator.

The "monitoring region" is a region to be monitored by the disaster prevention apparatus, specifically, is a certain extent of space and, for example, is a concept including a room (for example, a first-floor room A, a first-floor room B, etc.), a corridor, and a stair of a building, etc. In addition, the "abnormality of the monitoring region" indicates that the state of the monitoring region is different from a normal state and, specifically, is a concept including a fire outbreak, a gas leakage, etc.

The "outer cover" covers, for example, at least some of components of the disaster prevention apparatus.

The "indicator" is an indicator that outputs at least information about a test of the disaster prevention apparatus by emitting light, that is provided in the outer cover, and specifically, is a concept including an indicator, a portion, etc. configured such that at least a part of an indication surface of the indicator is exposed to the outside of a test apparatus when at least a part of the outer cover is covered with the test apparatus in order to perform a test of the disaster prevention apparatus.

In addition, the "indicator" is, for example, a concept including an indicator, a portion, etc. protruding from a side portion of the cover, is a concept including an indicator, a portion, etc. formed in at least an edge portion of a front portion of the outer cover, is a concept including a light guide, etc., and is a concept including a thin portion, etc. In addition, the "indication surface of the indicator" is, for example, a concept including a surface of the indicator that is exposed to the outside of the disaster prevention apparatus, that emits light, and that is viewed by a user, etc.

The "light guide" is, for example, a concept including a light guide, a portion, etc. that is formed in the outer cover and that guides light from a light emitter. The "thin portion" is, for example, a concept including a portion that is thinner than other portions of the outer cover and that is irradiated with light from the light emitter, etc., and is a concept including a portion that transmits some of irradiation light, etc. The "light emitter" is, for example, a unit that outputs light.

In addition, in each embodiment to be shown below, the case where the "disaster prevention apparatus" is a heat detector will be described, particularly, in a first embodiment, the case where the indicator is the light guide will be described, and in a second embodiment, the case where the indicator is the thin portion will be described.

Specific Contents of Embodiments

Next, specific contents of the embodiments will be described.

First Embodiment

First, a first embodiment will be described. In this embodiment, the case where the indicator is the light guide will be described.

Configuration—Detector

Figure 2:
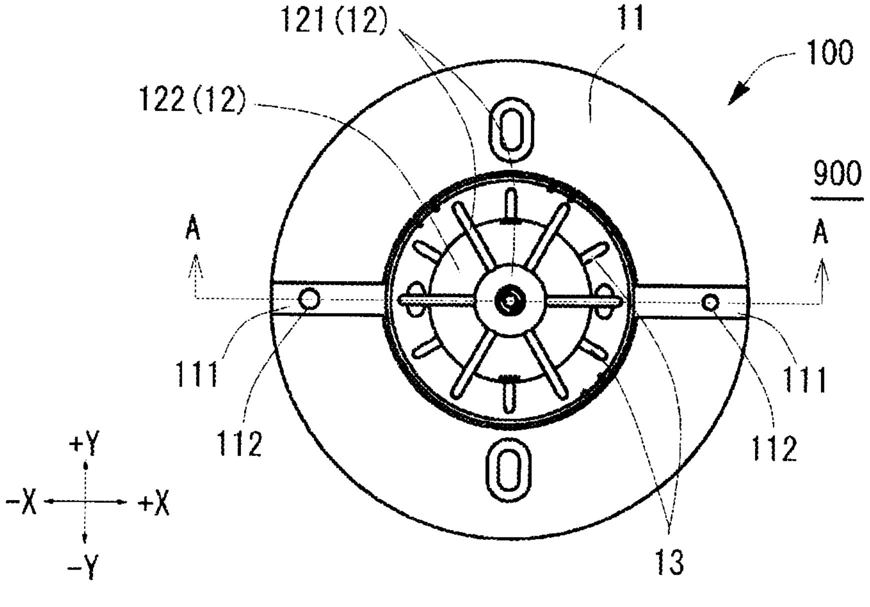
FIG. 2 is a plan view of the detector.
Figure 3:
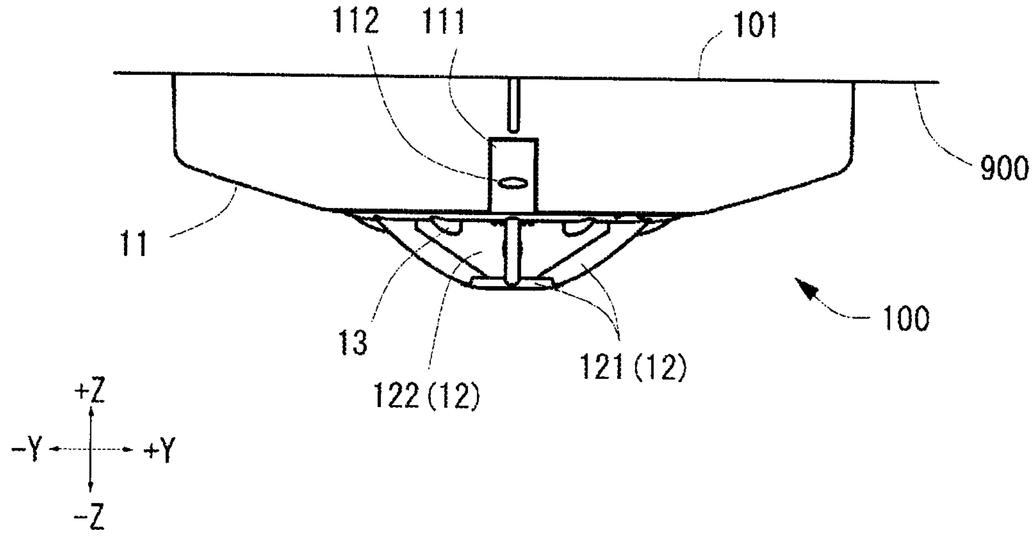
FIG. 3 is a side view of the detector.
Figure 4:
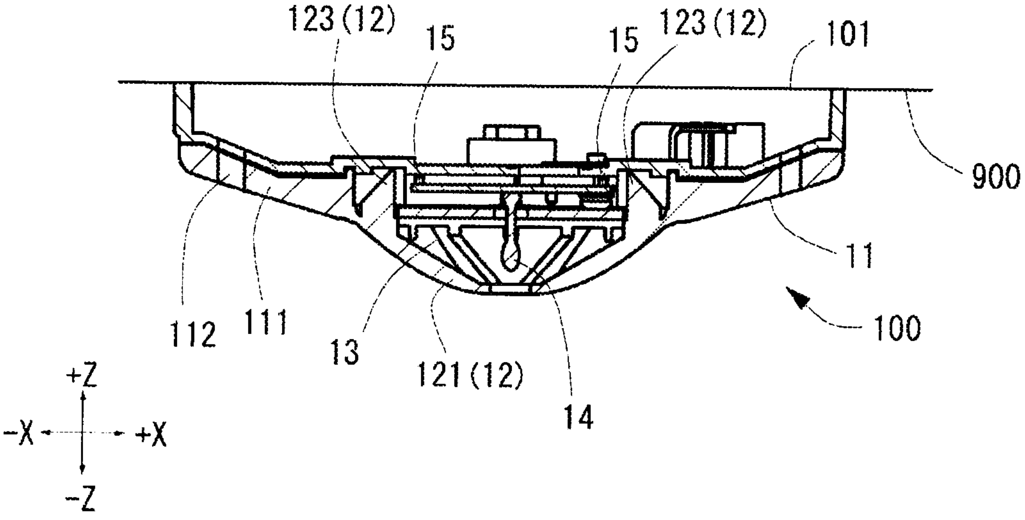
FIG. 4 is a cross-sectional view taken along line A-A of FIG. 2.

First, a configuration of a detector of the present embodiment will be described. FIG. 1 is a perspective view of the detector according to the embodiment of the invention, FIG. 2 is a plan view of the detector, FIG. 3 is a side view of the detector, and FIG. 4 is a cross-sectional view taken along line A-A of FIG. 2. Incidentally, in each drawing, a Z axis, and an X axis and a Y axis orthogonal to the Z axis will be described as indicating a vertical direction and a horizontal direction, respectively. In addition, for example, a "front portion", a "back portion", and a "side portion" will be described as terms referring to parts of a detector 100. Specifically, when the detector 100 is installed on an attachment object 900 that is a ceiling surface, a portion of the detector 100 located on a floor surface side (side opposite the attachment object 900 with respect the detector 100) (−Z direction in FIG. 3) is referred to as the "front portion", and a portion of the detector 100 facing the attachment object 900 that is a ceiling surface (+Z direction in FIG. 3) is referred to as the "back portion". In addition, a peripheral surface of the detector 100 connected to the "front portion" and to the "back portion" is the "side portion". Incidentally, the definitions of the "front portion", the "back portion", and the "side portion" also are the same in a second embodiment.

The detector 1 of each drawing of FIGS. 1 to 4 is a disaster prevention apparatus, specifically, is a heat detector that detects heat, is attached to, for example, the attachment object 900 that is a ceiling surface, through an attachment portion 101 of the detector 100 of FIG. 3 (for example, a so-called "detector base" and a detailed structure is not shown), and as one example, includes an outer cover 11, a protective portion 12, and prevention portions 13 of FIG. 1, and a thermistor 14 and a light emitter 15 of FIG. 4.

Configuration—Detector—Outer Cover

The outer cover 11 of FIG. 1 covers at least some of components of the detector 100. A specific type or configuration of the outer cover 11 is any type or any configuration, however, for example, as shown in FIG. 3, the outer cover 11 includes a cylindrical portion of which the diameter is the same even when extending away from the attachment portion 101, and a tapered portion that is reduced in diameter as extending away from the attachment portion 101, has a light-shielding property except for a specified portion, and includes light guide portions 111 and operation holes 112 of FIG. 2. Incidentally, the "light-shielding property" is the ability to block light and, for example, is a concept indicating the ability of the outer cover 11 to prevent light from passing from the inside to the outside.

The light guide portions 111 are the aforementioned indicators, and the light guides. A specific type or configuration of the light guide portions 111 is any type or any configuration, however, for example, the light guide portions 111 is formed in a part of the outer cover 11, are made of any material so as to function as light guides that guide and emit light, are formed separately from portions of the outer cover 11 having a light-shielding property, and allow light to pass through the outer cover 11 from the inside to the outside. In addition, in the light guide portions 111, for example, indication surfaces (surfaces exposed to the outside of the detector 100 shown in FIGS. 2 and 3) of the light guide portions 111 extend from a front portion side (−Z direction) of the outer cover 11 to a side portion side (+X direction or −X direction) of the outer cover 11, two light guide portions 111 are provided, as shown in FIG. 2, the indication surfaces of the light guide portions 111 have a linear shape when viewed from the front portion side of the outer cover 11, and the light guide portions 111 are provided at positions to correspond to the positions of the operation holes 112.

The operation holes 112 are operation portions for physically operating the detector 100. A specific type or configuration of the operation holes 112 is any type or any configuration, however, for example, the operation holes 112 are, for example, holes into which a projection of a predetermined jig is inserted to rotate the outer cover 11 of the detector 100 with respect to the attachment portion 101.

Configuration—Detector—Protective Portion

The protective portion 12 of FIG. 1 is a detection element protector. The "detection element protector" accommodates and protects, for example, the thermistor 14 that is a detection element. A specific type or configuration of the protective portion 12 is any type or any configuration, however, for example, the protective portion 12 is formed in a part of the outer cover 11, is made of any material so as to function as a light guide that guides and emits light, is formed separately from the portions of the outer cover 11 having a light-shielding property, and allows light to pass through the outer cover 11 from the inside to the outside. In addition, the protective portion 12 protects, for example, the thermistor 14 of FIG. 4, has a hollow portion for accommodating the thermistor 14, protrudes from the outer cover 11 toward a side opposite the attachment portion 101 (−Z direction), is provided at a center of the outer cover 11 in a direction in which the outer cover 11 is widened (direction parallel to an X-Y plane), and is integrally formed with the light guide portions 111. In addition, the protective portion 12 includes, for example, a frame portion 121 and opening portions 122 of FIG. 1, and a spectroscopic portion 123 of FIG. 4.

The frame portion 121 is, for example, a portion forming an outer shape of at least a part of the protective portion 12, and is a portion including one circular member forming a tip portion (−Z direction) of the detector 100, and six support members between the circular member and the outer cover 11, the support members supporting the circular member.

The opening portions 122 are, for example, portions through which a hot air current flows in and out with respect to the thermistor 14 provided in the hollow portion of the protective portion 12, and six opening portions 122 are provided in such a manner to be partitioned off by the aforementioned six support members of the frame portion 121.

The spectroscopic portion 123 is, for example, a portion that refracts, disperses, or reflects light output from the light emitter 15, and is a portion facing the light emitter 15.

Configuration—Detector—Prevention Portion

The prevention portions 13 of FIG. 1 are preventers that prevent a contact object from coming into contact with the thermistor 14 accommodated in the protective portion 12. Incidentally, the "contact object" is an object that is prevented from coming into contact by the prevention portions 13, and is a concept including, for example, a user's finger, etc. A specific type or configuration of the prevention portions 13 is any type or any configuration, however, the prevention portions 13 are, for example, projections provided in the opening portions 122.

Configuration—Detector—Thermistor

The thermistor 14 of FIG. 4 is a detection element. The "detection element" is, for example, a component that detects a physical quantity of a detection target. The "physical quantity of the detection target" is, for example, a quantity that can be generated or changed due to an abnormality of the monitoring region, and as one example, is a concept including temperature caused by heat or a hot air current, etc. A specific type or configuration of the thermistor 14 is any type or any configuration, however, the thermistor 14 detects, for example, a temperature caused by heat or a hot air current, protrudes in a direction orthogonal to the direction in which the outer cover 11 is widened (Z-axis direction), and is accommodated in the protective portion 12.

Configuration—Detector—Light Emitter

The light emitter 15 of FIG. 4 is the aforementioned light emitter. A specific type or configuration of the light emitter 15 is any type or any configuration, however, for example, the light emitter 15 causes the light guide portions 111 and the protective portion 12 to emit light, outputs light toward the spectroscopic portion 123, and can be formed of a light emitting diode, etc.

Emission of Light

Figure 5:
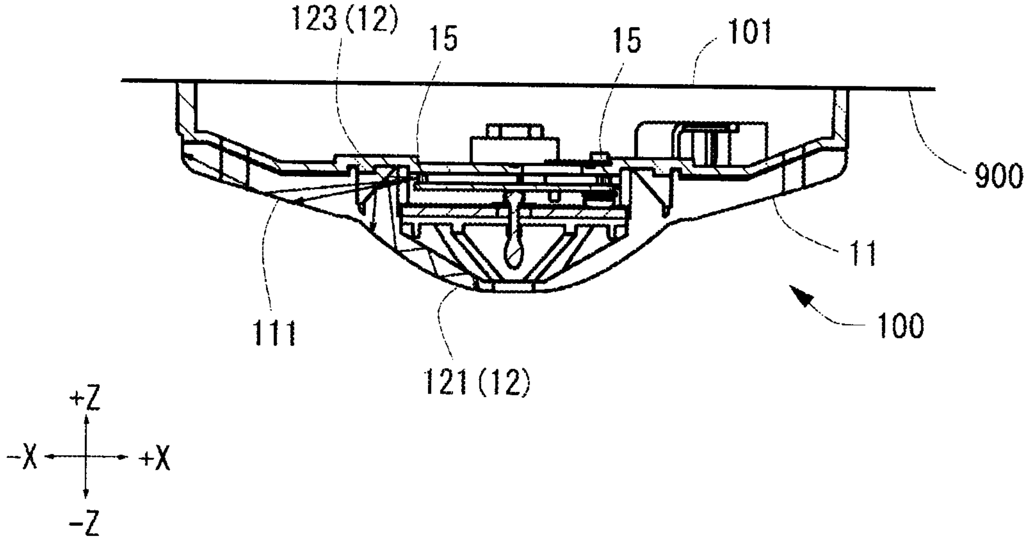
FIG. 5 is a view showing an optical path in FIG. 4 as an example.

Next, the emission of light by the detector 100 configured in such a manner will be described. Incidentally, the detector 100 emits light at any timing, and for example, any timing such as when information about a test of the detector 100 is output or when the detector 100 determines a fire outbreak based on a temperature of heat detected by the thermistor 14 is assumed. Incidentally, since the same process as in the related art is applicable to a process in which the detector 100 determines a fire outbreak, the description thereof will not be repeated. FIG. 5 is a view showing an optical path in FIG. 4 as an example.

A control unit (not shown) of the detector 100 of FIG. 5 causes the light emitter 15 to output light. In this case, the light from the light emitter 15 is refracted, dispersed, or reflected by the spectroscopic portion 123, and as shown in FIG. 5, is guided to the entireties of the light guide portions 111 and the protective portion 12. Incidentally, in FIG. 5, for convenience of description, only an optical path of light from the light emitter 15 on the left side of the drawing sheet is shown, but in reality, light is also output from the light emitter 15 on the right side of the drawing sheet, and is guided to the entireties of the light guide portions 111 and the protective portion 12. Then, the entireties of the light guide portions 111 and the protective portion 12 of FIG. 1 emit the light.

Test

Next, a test of the detector 100 configured in such a manner will be described. The "test" indicates testing the capability of the detector 100. Incidentally, specific contents of the test of the detector 100 are any contents, however, for example, the case will be described where a test is performed to determine whether heat applied by the detector 100 is detected, when the heat is applied to the detector 100 by simulating a fire outbreak using a test apparatus to be described later. Here, for example, a control unit of the detector 100 will be described below as being configured to acquire a result of detection of a temperature by the thermistor 14, to detect a fire when the acquired temperature is a threshold value or higher, and to output information indicating that the detector 100 has detected the fire in a test by continuing to output red light from the light emitter 15 of FIG. 4.

Figure 6:
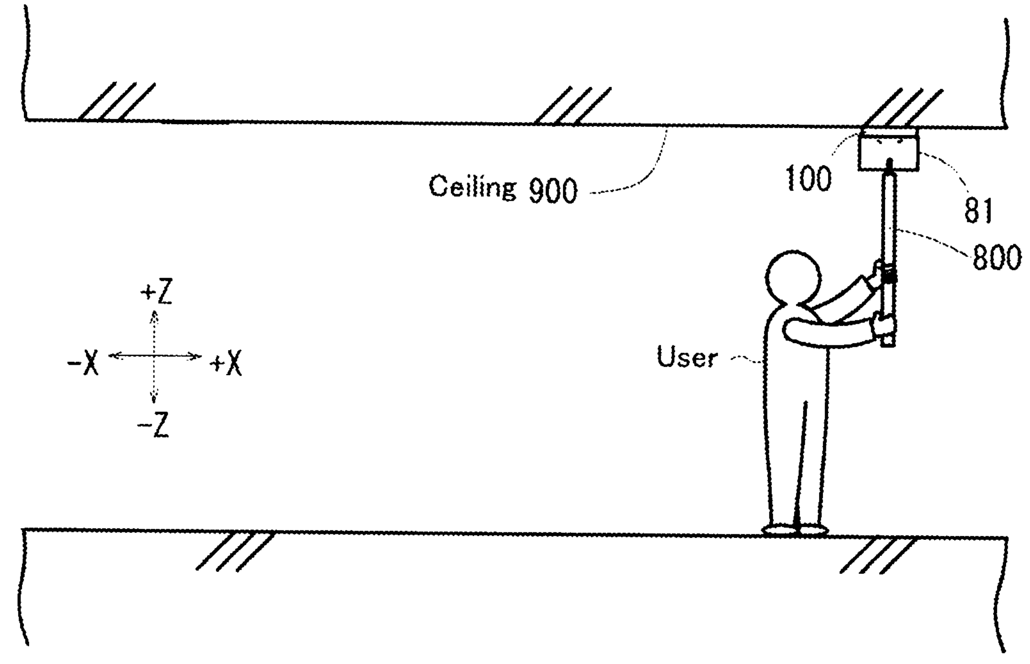
FIG. 6 is a side view showing a test apparatus and the detector.
Figure 7:
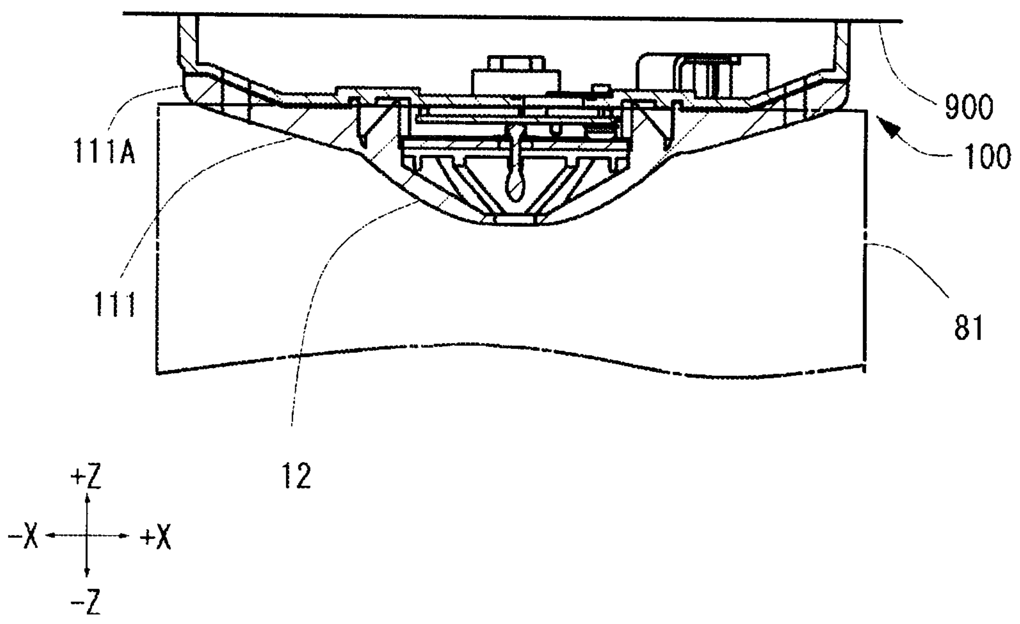
FIG. 7 is a view of a test jig with respect to the cross-sectional view of FIG. 4.
Figure 8:
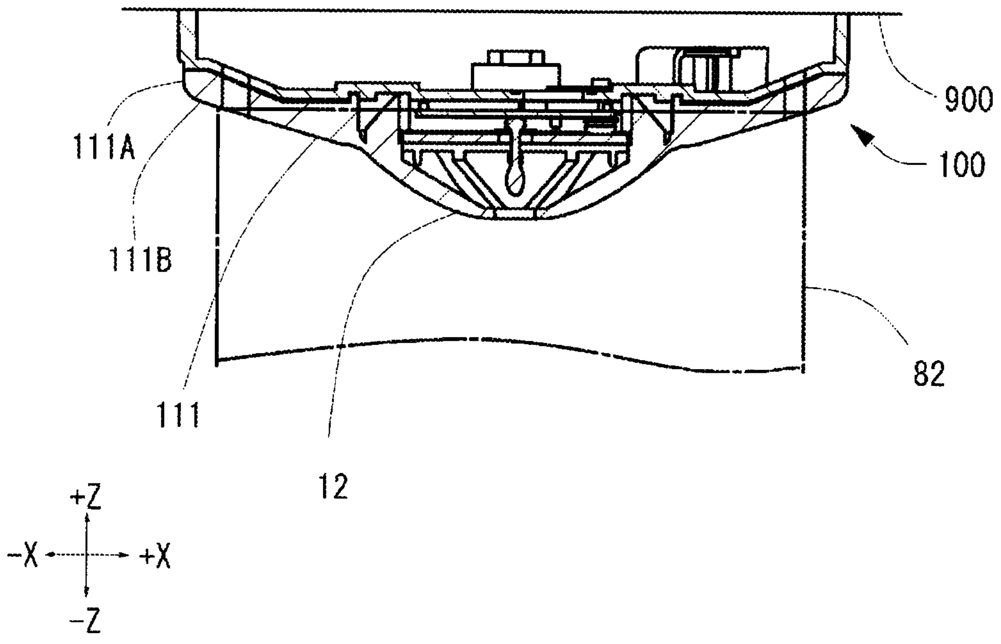
FIG. 8 is a view of a test adapter with respect to the cross-sectional view of FIG. 4.

FIG. 6 is a side view showing a test apparatus and the detector, FIG. 7 is a view of a test jig with respect to the cross-sectional view of FIG. 4, and FIG. 8 is a view of a test adapter with respect to the cross-sectional view of FIG. 4. Incidentally, in FIGS. 7 and 8, for convenience of description, a test jig 81 and a test adapter 82 are shown by an alternate long and short-dashed line. In addition, in FIGS. 7 and 8, a part of the detector 100 is provided in a hollow portion inside the test jig 81 and the test adapter 82, and is not actually visible, however, for convenience of description, is shown by a solid line. A test of the detector 100 is performed using a test apparatus 800 of FIG. 6.

Test—Test Apparatus

The test apparatus 800 is an apparatus used to perform a test of the detector 100, and includes, for example, a handle portion and the test jig 81 as shown in FIG. 6, and optionally includes the test adapter 82 of FIG. 8.

Test—Test Apparatus—Test Jig

The test jig 81 is the aforementioned test apparatus, specifically, is provided at a tip of the rod-shaped handle portion of the test apparatus 800, for example, has a cylindrical shape including a hollow portion for accommodating at least a part (for example, the protective portion 12, etc.) of the detector 100 inside and for applying heat, and is made of metal. The size of the test jig 81 is any size, however, for example, as shown in FIG. 7, the case will be described in which an outer diameter of the test jig 81 is larger than an outer diameter of the detector 100 and an inner diameter of the test jig 81 is smaller than the outer diameter of the detector 100.

Test—Test Apparatus—Test Adapter

The test adapter 82 of FIG. 8 is the aforementioned test apparatus, specifically, can be detachably attached to a tip side (+Z direction) of the test jig 81 of FIG. 6, for example, is used to convert the diameter into a smaller diameter than that of the test jig 81, for example, has a cylindrical shape, is made of metal, and includes a hollow portion that is continuous with the hollow portion of the test jig 81 when being attached. The size of the test adapter 82 is any size, however, for example, as shown in FIG. 8, the case in which an outer diameter of the test adapter 82 is smaller than the outer diameter of the detector 100 will be described.

Test—Specific Contents

Next, the case of performing a test without using the test adapter 82 and the case of performing a test using the test adapter 82 will be described.

First, in the case of performing a test without using the test adapter 82, as shown in FIG. 7, in a state where the test jig 81 is brought into contact with the detector 100 and a part (for example, the protective portion 12, etc.) of the detector 100 is accommodated in the hollow portion of the test jig 81, heat is applied from a hollow portion side of the test jig 81. In this case, the control unit of the detector 100 detects a fire, and causes the light emitter 15 of FIG. 4 to output red light. In addition, as described above, the red light is guided to the light guide portions 111 and to the protective portion 12, and the entireties of the light guide portions 111 and the protective portion 12 emit light. In this case, as shown in FIG. 7, a part of the light guide portions 111 and the protective portion 12 are hidden by the test jig 81 and are not visible from the outside, however, since a side portion 111A that is a part of each of the light guide portions 111 on the side portion side of the outer cover 11 is exposed, the emission of the red light from the side portion 111A is visible. For this reason, a user can identify information about the test by viewing the emission of the red light from the side portion 111A.

Next, in the case of performing a test using the test adapter 82, as shown in FIG. 8, in a state where the test adapter 82 is brought into contact with the detector 100 from the front portion side and a part (for example, the protective portion 12, etc.) of the detector 100 is accommodated in the hollow portion of the test adapter 82, heat is applied from a hollow portion side of the test adapter 82. In this case, the control unit of the detector 100 detects a fire, and then causes the light emitter 15 of FIG. 4 to output red light. In addition, as described above, the red light is guided to the light guide portions 111 and to the protective portion 12, and the entireties of the light guide portions 111 and the protective portion 12 emit light. In this case, as shown in FIG. 8, a part of the light guide portions 111 and the protective portion 12 are hidden by the test jig 81 and are not visible from the outside, however, since the side portion 111A that is a part of each of the light guide portions 111 on the side portion side of the outer cover 11 and a front edge portion 111B that is a part of each of the light guide portions 111 and that is formed in an edge portion of a front portion of the outer cover 11 are exposed, the emission of the red light from the side portion 111A and from the front edge portion 111B is visible. For this reason, a user can identify information about the test by viewing the emission of the red light from the side portion 111A and from the front edge portion 111B.

Effects of Embodiment

In such a manner, according to the present embodiment, when at least a part of the outer cover 11 is covered with the test jig 81 or with the test adapter 82 in order to perform a test of the detector 100, at least a part of the indication surfaces of the light guide portions 111 that are the indicators is exposed to the outside of the test jig 81 or the test adapter 82, so that, for example, even in a state where at least a part of the detector 100 is covered with the test jig 81 or with the test adapter 82, a part of the light guide portions 111 is visible, so that information about the test can be identified.

In addition, since the indicator includes the side portion 111A formed in the side portion of the outer cover 11, for example, the indicator is visible in any direction with respect to the detector 100, so that information about the test can be reliably identified.

In addition, since the indicator includes the front edge portion 111B formed in the edge portion of the front portion of the outer cover 11, for example, the indicator is visible even from directly below the detector 100, so that information on the test can be reliably identified.

In addition, since the indicator is a part of the light guide portions 111, for example, the degree of freedom in the installation position of the light emitter 15 that is a light source for the indicator can be improved, so that the degree of freedom in designing the detector 100 can be improved.

Second Embodiment

Next, a second embodiment will be described. In this embodiment, the case where the indicator is the thin portion will be described. Incidentally, unless other specified, each configuration of the second embodiment is assumed to be the same as each configuration having the same name in the first embodiment.

Configuration—Detector

Figure 9:
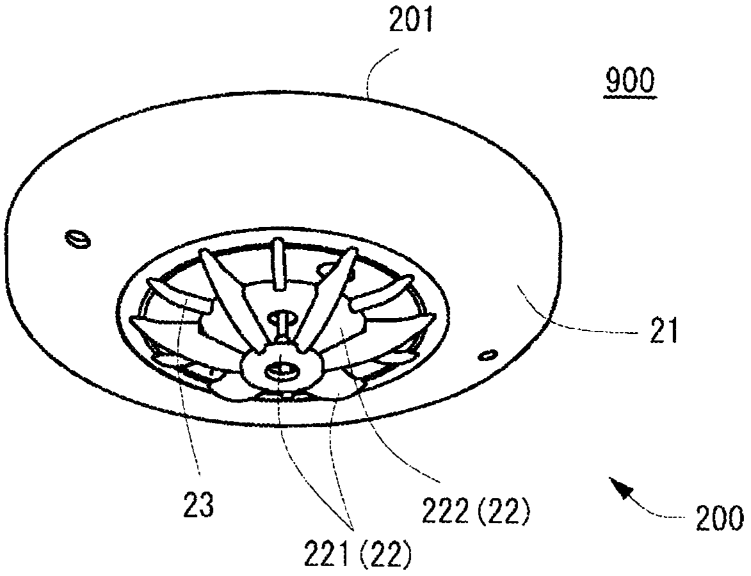
FIG. 9 is a perspective view of a detector according to a second embodiment.
Figure 10:
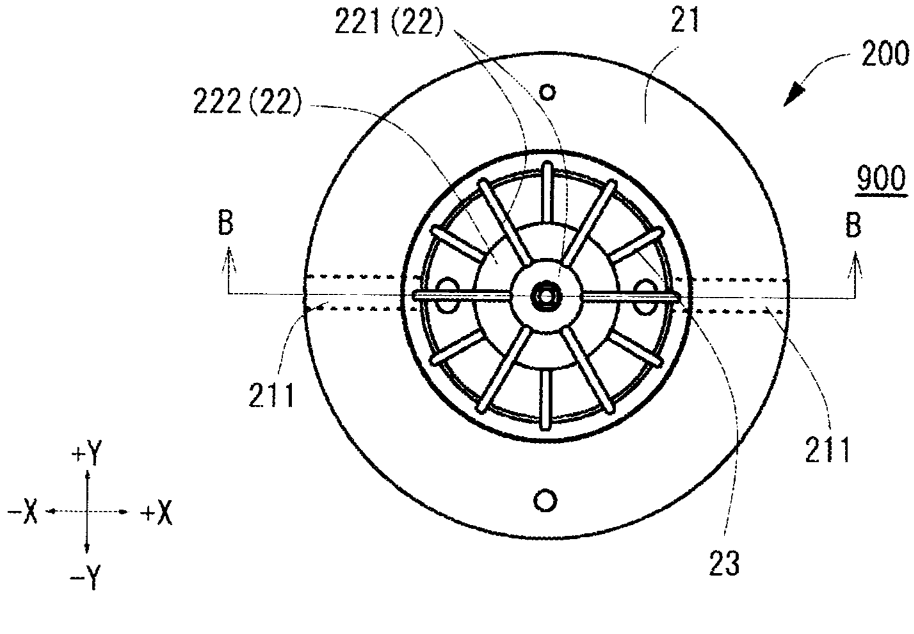
FIG. 10 is a plan view of the detector.
Figure 11:
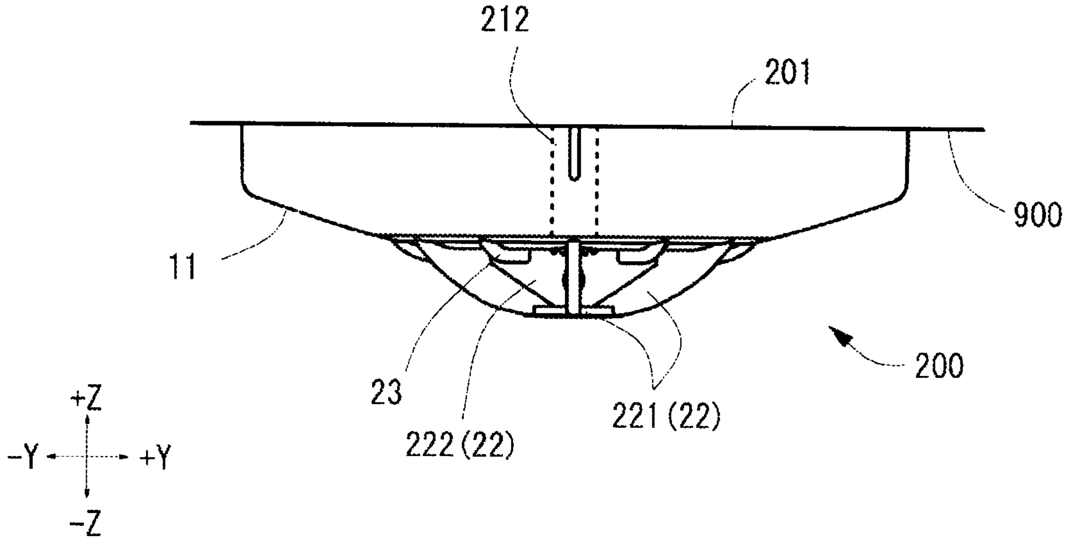
FIG. 11 is a side view of the detector.
Figure 12:
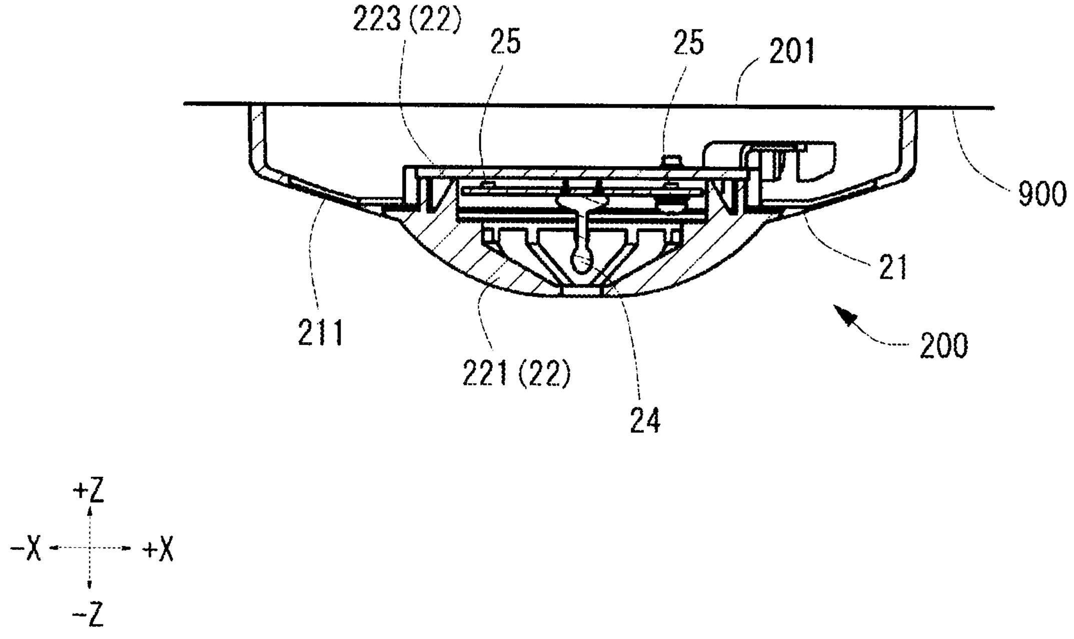
FIG. 12 is a cross-sectional view taken along line B-B of FIG. 10.

First, a configuration of a detector of the present embodiment will be described. FIG. 9 is a perspective view of the detector according to the embodiment of the invention, FIG. 10 is a plan view of the detector, FIG. 11 is a side view of the detector, and FIG. 12 is a cross-sectional view taken along line B-B of FIG. 10. A detector 200 of each drawing is a disaster prevention apparatus, specifically, is a heat detector that detects heat, is attached to, for example, the attachment object 900 that is a ceiling surface, through an attachment portion 201 of the detector 200 of FIG. 11, and as one example, includes an outer cover 21, a protective portion 22, and prevention portions 23 of FIG. 9, and a thermistor 24 and a light emitter 25 of FIG. 12.

Configuration—Detector—Outer Cover

The outer cover 21 of FIG. 9 covers at least some of components of the detector 200. A specific type or configuration of the outer cover 21 is any type or any configuration, however, for example, the outer cover 21 blocks all or only some of light, and includes thin portions 211 of FIG. 10.

The thin portions 211 are the indicators, and are portions that are relatively thin in thickness compared to other portions of the outer cover 21. A specific type or configuration of the thin portions 211 is any type or any configuration, however, the thin portions 211 are, for example, portions thin enough to be able to transmit at least some of irradiation light (namely, portions thin enough to block only some of irradiation light), are portions integrally formed with the other portions of the outer cover 21, extend from a front portion side (−Z direction) of the outer cover 21 to a side portion side (+X direction or −X direction) of the outer cover 21, two thin portions 211 are provided, and as shown in FIG. 10, have a linear shape when viewed from the front portion side of the outer cover 21.

Incidentally, the "other portions of the outer cover 21" are a part of the outer cover 21, specifically, are portions of the outer cover 21 other than the thin portions 211, and for example, are portions thick enough to block all irradiation light.

Configuration—Detector—Protective Portion

The protective portion 22 of FIG. 9 is the aforementioned detection element protector. A specific type or configuration of the protective portion 22 is any type or any configuration, however, for example, the protective portion 22 is formed in a part of the outer cover 21, is made of any material so as to function as a light guide that guides and emits light, is formed separately from the portions of the outer cover 21 having a light-shielding property, and allows light to pass through the outer cover 21 from the inside to the outside. In addition, the protective portion 22 protects, for example, the thermistor 24 of FIG. 12, and includes, for example, a frame portion 221 and opening portions 222 of FIG. 10, and a spectroscopic portion 223 of FIG. 12. Incidentally, since configurations of the frame portion 221, the opening portions 222, and the spectroscopic portion 223 are the same as the configurations of those having the same names in the first embodiment, the descriptions thereof will not be repeated.

Configuration—Detector—Prevention Portion, Thermistor, Light Emitter

Since configurations of the prevention portions 23 of FIG. 9 and the thermistor 24 and the light emitter 25 of FIG. 12 are the same as the configurations of those having the same names in the first embodiment, the descriptions thereof will not be repeated.

Emission of Light

Figure 13:
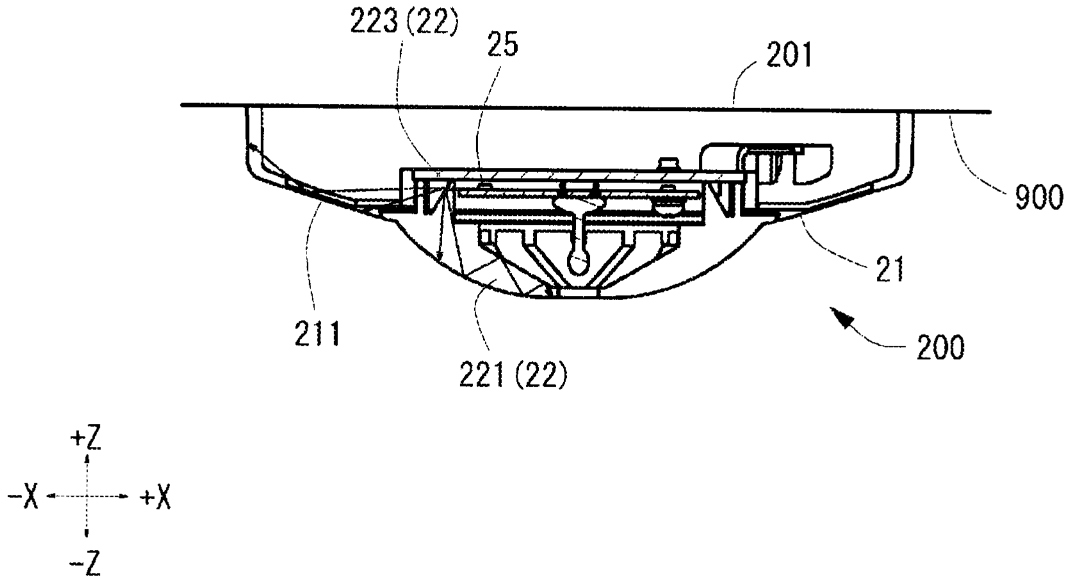
FIG. 13 is a view showing an optical path in FIG. 12 as an example.

Next, the emission of light by the detector 200 configured in such a manner will be described. FIG. 13 is a view showing an optical path in FIG. 12 as an example.

A control unit (not shown) of the detector 200 of FIG. 13 causes the light emitter 25 to output light. In this case, the light from the light emitter 25 is refracted, dispersed, or reflected by the spectroscopic portion 223, as shown in FIG. 13, the entirety of the thin portions 211 is irradiated with the light, and the light is guided to the entirety of the protective portion 22. Incidentally, in FIG. 13, for convenience of description, only an optical path of light from the light emitter 25 on the left side of the drawing sheet is shown, but in reality, light is also output from the light emitter 25 on the right side of the drawing sheet, the entirety of the thin portions 211 is irradiated with the light, and the light is guided to the entirety of the protective portion 22. Then, the entireties of the thin portions 211 and the protective portion 22 of FIG. 10 emit the light.

Test

Figure 14:
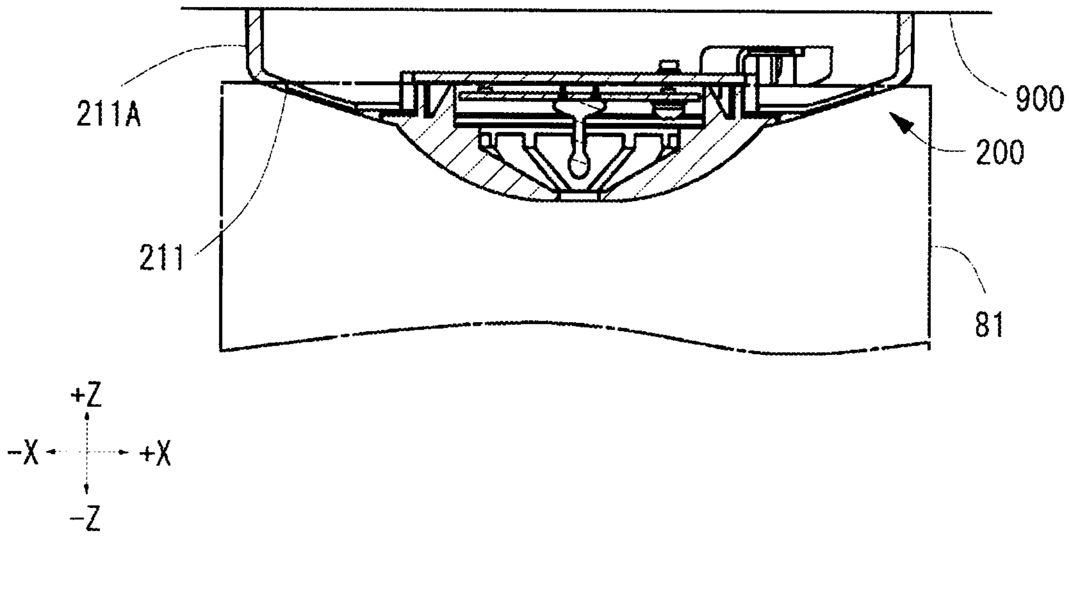
FIG. 14 is a view of the test jig with respect to the cross-sectional view of FIG. 12.
Figure 15:
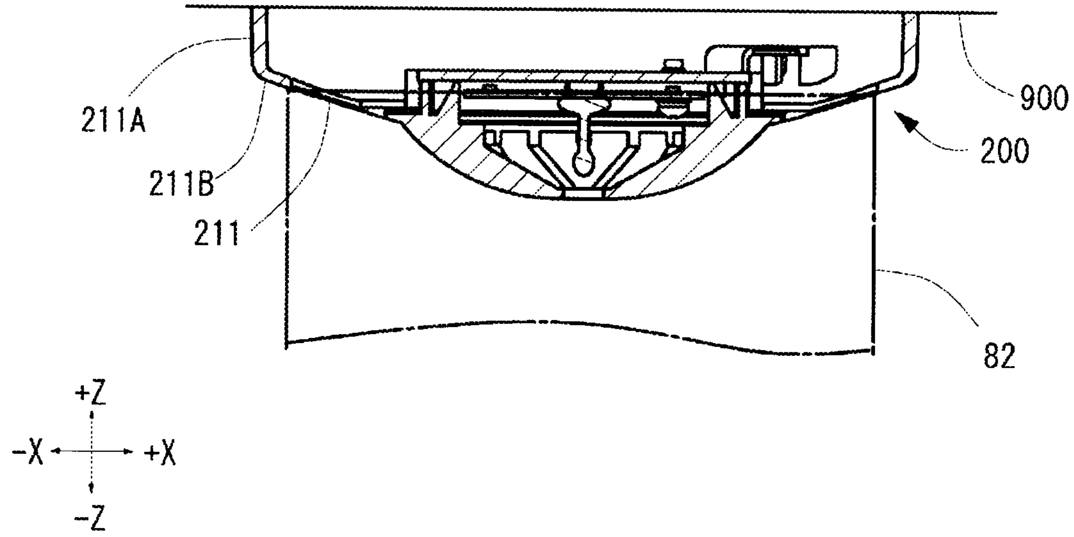
FIG. 15 is a view of the test adapter with respect to the cross-sectional view of FIG. 12.

Next, a test of the detector 200 configured in such a manner will be described. FIG. 14 is a view of the test jig with respect to the cross-sectional view of FIG. 12, and FIG. 15 is a view of the test adapter with respect to the cross-sectional view of FIG. 12. Here, the case of performing a test without using the test adapter 82 and the case of performing a test using the test adapter 82 will be described.

First, in the case of performing a test without using the test adapter 82, as shown in FIG. 14, in a state where the test jig 81 is brought into contact with the detector 200 and a part (for example, the protective portion 22, etc.) of the detector 200 is accommodated in the hollow portion of the test jig 81, heat is applied from the hollow portion side of the test jig 81. In this case, a control unit of the detector 200 detects a fire, and causes the light emitter 25 of FIG. 13 to output red light. In addition, as described above, the entirety of the thin portions 211 is irradiated with the red light, and the red light is guided to the entirety of the protective portion 22, so that the entireties of the thin portions 211 and the protective portion 22 emit light. In this case, as shown in FIG. 14, a part of the thin portions 211 and the protective portion 22 are hidden by the test jig 81 and are not visible from the outside, however, since a side portion 211A that is a part of each of the thin portions 211 on the side portion side of the outer cover 21 is exposed, the emission of the red light from the side portion 211A is visible. For this reason, a user can identify information about the test by viewing the emission of the red light from the side portion 211A.

Next, in the case of performing a test using the test adapter 82, as shown in FIG. 15, in a state where the test adapter 82 is brought into contact with the detector 200 and a part (for example, the protective portion 22, etc.) of the detector 200 is accommodated in the hollow portion of the test adapter 82, heat is applied from the hollow portion side of the test adapter 82. In this case, the control unit of the detector 200 detects a fire, and causes the light emitter 25 of FIG. 13 to output red light. In addition, as described above, the entirety of the thin portions 211 is irradiated with the red light, and the red light is guided to the entirety of the protective portion 22, so that the entireties of the thin portions 211 and the protective portion 22 emit light. In this case, as shown in FIG. 15, a part of the thin portions 211 and the protective portion 22 are hidden by the test jig 81 and are not visible from the outside, however, since the side portion 211A that is a part of each of the thin portions 211 on the side portion side of the outer cover 21 and a front edge portion 211B that is a part of each of the thin portions 211 and that is formed in an edge portion of a front portion of the outer cover 21 are exposed, the emission of the red light from the side portion 211A and from the front edge portion 211B is visible. For this reason, a user can identify information about the test by viewing the emission of the red light from the side portion 211A and from the front edge portion 211B.

Effects of Embodiment

In such a manner, according to the present embodiment, since the indicator is a part of the thin portions 211, for example, providing another component for emitting light is not required, so that the number of components can be reduced, and the cost can be reduced.

MODIFICATION EXAMPLES OF EMBODIMENTS

The embodiments according to the invention have been described above, but the specific configurations, unit, and portions of the invention can be modified and improved in any manner within the scope of the technical concept of each invention in the appended claims. Hereinafter, such modification examples will be described.

Regarding Technical Problem and Effects of Invention

First, the technical problems and the effects of the invention are not limited to the above-described contents, and may differ depending on details of an implementation environment or configuration of the invention, and only some of the above-described problems may be solved, or only some of the above-described effects may be obtained.

Regarding Segregation and Integration

In addition, the above-described configurations are functionally conceptual, and do not necessarily need to be physically configured as shown in the drawings. Namely, the specific modes of the segregation and integration of the portions are not limited to those shown in the drawings, and all or some thereof can be configured to be functionally or physically segregated or integrated in any unit.

Regarding Light Guide Portion and Thin Portion

In addition, in the first embodiment, as shown in FIG. 2, the case in which the light guide portions 111 have a linear shape when viewed from the front portion side of the outer cover 11 has been described, but the invention is not limited thereto. For example, the light guide portions 111 may have a curved shape (for example, an S shape as a whole) when viewed from the front portion side of the outer cover 11. Incidentally, the thin portions 211 of FIG. 10 in the second embodiment may also have a curved shape (for example, an S shape as a whole) similarly.

In addition, in the embodiments, the case where the two light guide portions and the two thin portions are provided has been described, but the invention is not limited thereto. For example, the light guide portions and the thin portions may be omitted. Alternatively, one light guide portion and one thin portion may be provided, or three or more light guide portions and three or more thin portions may be provided.

Regarding Protrusion Portion

Figure 16:
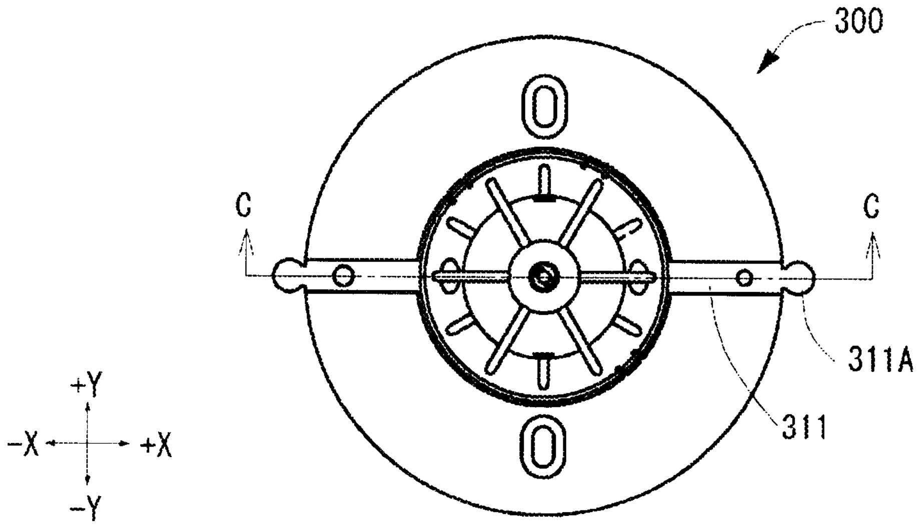
FIG. 16 is a plan view of the detector.
Figure 17:
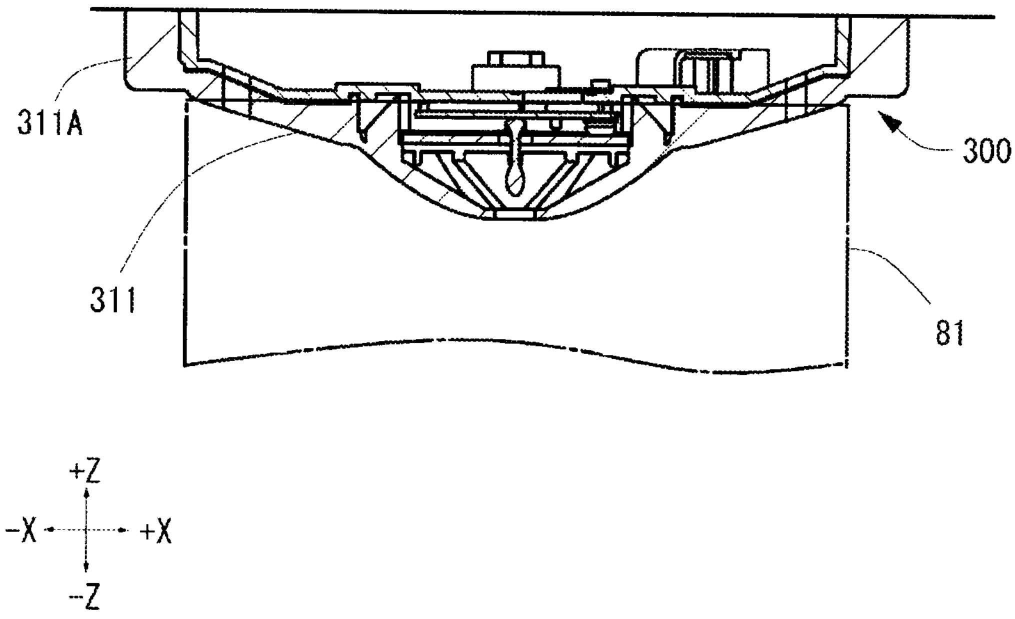
FIG. 17 is a view of the test jig with respect to a cross-sectional view taken along line C-C of FIG. 16.

In addition, protrusion portions may be provided in the detector of each embodiment, and may be used as the indicators. FIG. 16 is a plan view of a detector, and FIG. 17 is a view of the test jig with respect to a cross-sectional view taken along line C-C of FIG. 16. A specific method for mounting the protrusion portions is any method, however, for example, as shown in FIG. 16, tips of light guide portions 311 having the same configuration as that of the light guide portions 111 may be configured as protrusion portions 311A by extending the length of the light guide portions 111 of FIG. 2 of the first embodiment in an X-axis direction. In the case of a detector 300 configured in such a manner, when the test jig 81 is provided as shown in FIG. 17, the protrusion portions 311A that are a part of the light guide portions 311 are exposed from the test jig 81, so that when the protrusion portions 311A emit light from the light emitter during a test, a user can view the emission of the light. In such a configuration, since the protrusion portions 311A that are the indicators protrude from a side portion of an outer cover of the detector 300, for example, the protrusion portions 311A that are the indicators are reliably visible, so that information about the test can be reliably identified.

In addition, for example, in the detector 200 of the second embodiment as well, similarly to the detector 300 of FIG. 16, protrusion portions may be formed as the indicators by setting the outer shape of the outer cover 21 to an outer shape with the protrusion portions, and then by forming the protrusion portions as thin portions.

In addition, for example, an indicator light, etc. that is a protrusion portion may be configured as the indicator by forming the indicator light (for example, the same cannonball-shaped indicator light as in the related art, etc.) other than the light guide portions or the thin portions on a side surface of the detector.

Regarding Features

In addition, the configurations of each embodiment and the features of the modification examples may be combined in any manner. For example, the detector 100 of FIG. 2 may be configured such that thin portions are provided in the outer cover 11 and the thin portions emit light together with the light guide portions 111, or the detector 200 of FIG. 10 may be configured such that light guide portions are provided in the outer cover 11 and the light guide portions emit light together with the thin portions 211.

One embodiment of the present invention provides a disaster prevention apparatus comprises: an outer cover; and an indicator that outputs at least information about a test of the disaster prevention apparatus by emitting light, and that is provided in the outer cover, wherein when at least a part of the outer cover is covered with a test apparatus in order to perform the test of the disaster prevention apparatus, at least a part of an indication surface of the indicator is exposed to an outside of the test apparatus.

According to this embodiment, when at least a part of the outer cover is covered with the test apparatus in order to perform a test of the disaster prevention apparatus, at least a part of the indication surface of the indicators is exposed to the outside of the test apparatus, so that, for example, even in a state where at least a part of the disaster prevention apparatus is covered with the test apparatus, a part of the indicators is visible, so that information about the test can be identified.

Another embodiment of the present invention provides the disaster prevention apparatus according to the above embodiment, wherein the indicator protrudes from a side portion of the outer cover.

According to this embodiment, since the indicators protrude from a side portion of an outer cover, for example, the indicators are reliably visible, so that information about the test can be reliably identified.

Another embodiment of the present invention provides the disaster prevention apparatus according to the above embodiment, wherein the indicator is formed in at least a side portion of the outer cover.

According to this embodiment, since the indicator is formed at the side portion of the outer cover, for example, the indicator is visible in any direction with respect to the disaster prevention apparatus, so that information about the test can be reliably identified.

Another embodiment of the present invention provides the disaster prevention apparatus according to the above embodiment, wherein the indicator is formed in at least an edge portion of a front portion of the outer cover.

According to this embodiment, since the indicator is formed at the edge portion of the front portion of the outer cover, for example, the indicator is visible even from directly below the disaster prevention apparatus, so that information on the test can be reliably identified.

Another embodiment of the present invention provides the disaster prevention apparatus according to the above embodiment, wherein the indicator is a light guide that is formed in the outer cover, and that guides light from a light emitter.

According to this embodiment, since the indicator is a part of the light guide, for example, the degree of freedom in the installation position of a light source for the indicator (for example, the light emitter) can be improved, so that the degree of freedom in designing the disaster prevention apparatus can be improved.

Another embodiment of the present invention provides the disaster prevention apparatus according to the above embodiment, wherein the indicator is a thin portion that is thinner than other portions of the outer cover, and that is irradiated with light from a light emitter.

According to this embodiment, since the indicator is a part of the thin portions, for example, providing another component for emitting light is not required, so that the number of components can be reduced, and the cost can be reduced.

Another embodiment of the present invention provides the disaster prevention apparatus according to the above embodiment, wherein the disaster prevention apparatus is at least a heat detector.

According to this embodiment, since the disaster prevention apparatus is at least a heat detector, for example, it is possible to provide a heat detector that allows information about the test to be ascertained even when at least part of the disaster prevention apparatus is covered by the test apparatus.

REFERENCE SIGNS LIST

11: outer cover
12: protective portion
13: prevention portion
14: thermistor
15: light emitter
21: outer cover
22: protective portion
23: prevention portion
24: thermistor
25: light emitter
81: test jig
82: test adapter
100: detector
101: attachment portion
111: light guide portion
111A: side portion
111B: front edge portion
112: operation hole
121: frame portion
122: opening portion
123: spectroscopic portion
200: detector
201: attachment portion
211: thin portion
211A: side portion
211B: front edge portion
221: frame portion
222: opening portion
223: spectroscopic portion
311: light guide portion
311A: protrusion portion
800: test apparatus
900: attachment object

The invention claimed is:

1. A disaster prevention apparatus installed on an attachment object of a monitoring region comprising:
- an outer cover;
- an indicator that outputs at least information about a test of the disaster prevention apparatus by emitting light, and that is provided in the outer cover; and
- a detection element protector that accommodates a detection element to detect a fire outbreak or a gas leakage in the monitoring region, and that protrudes from the outer cover,
- wherein the indicator is formed as a thin portion that is a portion thinner than other portions of the outer cover,
- wherein the detection element protector has a spectroscopic portion that allows light from a light emitter to enter the detection element protector and the thin portion,
- wherein the light from the light emitter is viewed from outside of the outer cover through the detection element protector and the thin portion,
- wherein the outer cover comprises a front portion which is located on a side opposite the attachment object with respect to the disaster prevention apparatus, a back portion which is located on a side facing the attachment object, and a side portion which is a peripheral surface connected to the front portion and to the back portion,
- wherein the thin portion is formed in at least the side portion of the outer cover, and
- wherein when at least a part of the front portion of the outer cover is covered with a test apparatus in order to perform the test of the disaster prevention apparatus, at least a part of an indication surface of the thin portion which is a part formed at the side portion of the outer cover is exposed to an outside of the test apparatus.

2. The disaster prevention apparatus according to claim 1, wherein the thin portion protrudes from a side portion of the outer cover.

3. The disaster prevention apparatus according to claim 1, wherein the disaster prevention apparatus is at least a heat detector.

* * * * *